(12) United States Patent
Watson

(10) Patent No.: US 9,232,215 B1
(45) Date of Patent: Jan. 5, 2016

(54) MEASURING VIDEO ACUITY

(76) Inventor: Andrew B. Watson, Los Gatos, CA (US)

(*) Notice: Subject to any disclaimer, the term of this patent is extended or adjusted under 35 U.S.C. 154(b) by 469 days.

(21) Appl. No.: 13/444,789

(22) Filed: Apr. 11, 2012

(51) Int. Cl.
*H04N 17/00* (2006.01)

(52) U.S. Cl.
CPC ............ *H04N 17/004* (2013.01); *H04N 17/00* (2013.01); *H04N 17/002* (2013.01)

(58) Field of Classification Search
None
See application file for complete search history.

(56) References Cited

U.S. PATENT DOCUMENTS

| | | | | |
|---|---|---|---|---|
| 6,493,023 | B1* | 12/2002 | Watson | 348/180 |
| 8,755,595 | B1* | 6/2014 | Bissacco et al. | 382/159 |
| 2012/0069179 | A1* | 3/2012 | Gish | 348/143 |

OTHER PUBLICATIONS

A. Watson, "Video Acuity: A Metric to Quantify the Effective Performance of Video Systems," in Imaging and Applied Optics, OSA Technical Digest (CD) (Optical Society of America, 2011), paper IMD3, Optical Society of America received on Mar. 31, 2011.*
ASTM International "Standard Test Method for Determining Visual Acuity and Field of View of On-Board Video Systems for Teleoperation of Robots for Urban Search and Rescue Applications," vol. ASTM E2566-08. West Conshohocken, PA, 19428-2959 USA: ASTM International, 2008, pp. 1-6.*
Pelli, Denis G., et al. "Feature detection and letter identification." Vision research 46.28 (2006): 4646-4674.*
Watson, Andrew B. "Display motion blur: Comparison of measurement methods." Journal of the Society for Information Display 18.2 (2010): 179-190.*
Sloan, L. L., Rowland, W. M., & Altman, A. "Comparison of three types of test target for measurement of visual acuity," Q. Rev. Ophthalmol. Otorhinolaryngol., 8, 4-17, 1952.
Johnson, J., "Analysis of image forming systems," Image Intensifier Symposium, AD 220160: Warfare Electrical Engineering Department, U.S. Army Research and Development Laboratories, Ft. Belvoir, Va., 244-73, 1958.
Schade, O., "On the quality of color-television images and the perception of colour detail," J. Soc. of Motion Pictures and Television Engineers, 67(12), 801-19, 1958.
Huck, F.O. et al., "Image gathering and processing: information and fidelity," J Opt Soc Am A, 2(10), 1644-66, 1985.
Leachtenauer, J.C., et al., "General Image-Quality Equation: GIQE," Appl. Opt., 36(32), 8322-28, 1997.
Vollmerhausen, R.H. et al., "New metric for predicting target acquisition performance," Optical Engineering, 43(11), 2806-18, 2004.
"Software," retrieved online Jan. 19, 2012, psych.nyu.edu/pelli/software.html.

* cited by examiner

*Primary Examiner* — Tize Ma
*Assistant Examiner* — Yu Chen
(74) *Attorney, Agent, or Firm* — John F. Schipper; Robert M. Padilla

(57) ABSTRACT

A method of measuring the video acuity of a physical imaging system is disclosed. A chart comprising an image of a set of test symbols is provided. The set of test symbols comprises a plurality of symbols repeated at a plurality of symbol sizes. A digital image of the chart is obtained using the imaging system. The digital image is cropped to obtain a set of cropped images comprising individual digital images of each test symbol in the set of test symbols. A template image of a test symbol is aligned with a test image comprising one member of the set of cropped images. The template image comprises a digitally generated image of the test symbol in the test image. The normalized correlation between the aligned template image and the test image is determined. The test symbol whose template image has the highest correlation with the test image is identified.

12 Claims, 6 Drawing Sheets

A

C D H K N O R S V Z

B

C

D

CDHKNORSVZ
CDHKNORSVZ
CDHKNORSVZ
CDHKNORSVZ
CDHKNORSVZ
CDHKNORSVZ
CDHKNORSVZ
CDHKNORSVZ
CDHKNORSVZ
CDHKNORSVZ
CDHKNORSVZ
CDHKNORSVZ
CDHKNORSVZ

MEASURING VIDEO ACUITY

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

One or more embodiments of the present invention relate to methods for measuring the video acuity of imaging systems.

BACKGROUND

In recent years there has been a proliferation of video systems in use by public and private entities to monitor events and locations. They can be very simple, inexpensive systems or very complex, powerful, and expensive systems. Video systems are used by fire departments, police departments, Homeland Security, and a wide variety of commercial entities. Places to be monitored include streets, stores, banks, airports, cars, and aircraft, as well as many other settings. Video systems are also used for a variety of specific tasks, including detection of smoke and fire, recognition of weapons, face identification, and event perception. In all of these contexts, the quality of the video system impacts the performance of the visual task. Buyers of video systems need to match the quality of the system to the demands of their task, but the complexity and heterogeneity of the systems and tasks makes this very difficult.

A number of methods have been used to quantify the performance of imaging systems. These can generally be applied to any image input or output device including still and video cameras, still and video displays, printers, and the like. Specific metrics may also be applicable to analog images, digital images or both. Resolution targets with letters of varying size and horizontal and vertical line patterns are frequently used, although most often these are used to test the physical limits of resolution of a particular optical system and often do not closely relate to human perception of image resolution. Other more quantitative measures of performance have been devised. Examples include the modulation transfer function (MTF) commonly used in quantifying the performance of optics. The MTF measures how an imaging system (such as a lens) reproduces (or transfers) detail from the object to the image as a function of the line frequency of a test grating. (Schade, O., "On the quality of color-television images and the perception of colour detail," *J. Soc. of Motion Pictures and Television Engineers*, 67(12), 801-19, 1958).

There are other alternatives. One can measure the number of visible sinusoidal cycles on the target (Johnson, J., "Analysis of image forming systems," Image Intensifier Symposium, AD 220160: Warfare Electrical Engineering Department, U.S. Army Research and Development Laboratories, Ft. Belvoir, Va., 244-73, 1958; and Vollmerhausen, R. H. et al., "New metric for predicting target acquisition performance," *Optical Engineering*, 43(11), 2806-18, 2004). One can evaluate specific selected image attributes (Leachtenauer, J. C., et al., "General Image-Quality Equation: GIQE," *Appl. Opt.*, 36(32), 8322-28, 1997). One can also make a more formal analysis in terms of information theory (Huck, F. O. et al., "Image gathering and processing: information and fidelity," *J Opt Soc Am A*, 2(10), 1644-66, 1985). Typically, these measures rely on a particular theoretical model of imaging with little or no regard to how the human visual system perceives a given image. The measures can be extremely valuable to engineers trying to improve the performance of a given imaging technology, but they are typically not found to be useful by end users trying to select among a set of competing options for a specific application.

What is needed is a measure of visual performance which can be applied to complete imaging systems and/or imaging subsystems and which can be used to compare systems in an intuitively meaningful way that is more closely related to human perception.

SUMMARY OF THE INVENTION

A method of measuring the video acuity of a physical imaging system is disclosed. A chart comprising an image of a set of test symbols is provided. The set of test symbols comprises a plurality of symbols repeated at a plurality of symbol sizes. A digital image of the chart is obtained using the imaging system. The digital image is cropped to obtain a set of cropped images comprising individual digital images of each test symbol in the set of test symbols. A template image of a test symbol is aligned with a test image comprising one member of the set of cropped images. The template image comprises a digitally generated image of the test symbol in the test image. The normalized correlation between the aligned template image and the test image is determined. The test symbol whose template image has the highest correlation with the test image is identified. The aligning, determining, and identifying is repeated for each member of the set of cropped images. For each symbol size within the set of test symbols, the number of test symbols that were correctly identified is determined. Lastly, the symbol size (height) S is found, above which more than a predetermined fraction (e.g., 0.6) of test symbols were correctly identified.

The video acuity is A=1/S symbols per degree. The imaging system can be a still camera with output to a still display or printer, a video camera, or a video display. The set of test symbols can have sizes ranging from a size large enough that 100% were correctly identified to a size small enough that identification was no better than chance and can be letters of an alphabet, rendered in the Sloan font. An exemplary set of letters are C, D, H, K, N, O, R, S, V, and Z.

BRIEF DESCRIPTION OF THE DRAWINGS

FIG. 2 shows an example of a test chart for use in measuring video acuity.

DETAILED DESCRIPTION

Figure 1:
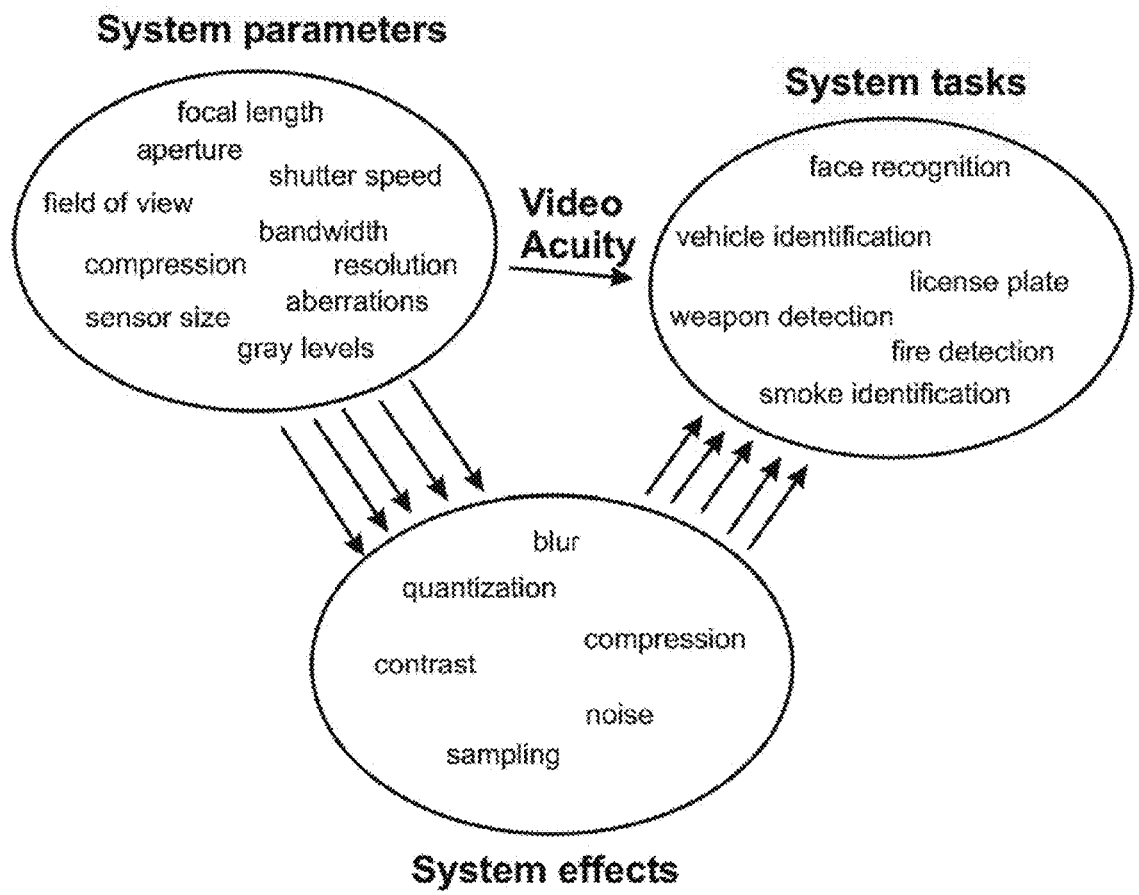
FIG. 1 shows the challenges of video quality assessment.

Before the present invention is described in detail, it is to be understood that unless otherwise indicated this invention is not limited to specific imaging systems. Exemplary embodiments are described in terms of video systems such as those used for surveillance applications, but the measurement systems and methods are generally applicable to many other imaging systems including still cameras and displays, video cameras and displays. Printers can be used as output devices instead of displays. Many systems involve a variety of components and subsystems, and their performance can be quantified individually or collectively as needed for particular comparisons. For example, a video surveillance system may comprise a video camera with a zoom lens, data compression algorithms, data transmission cables, a video recording device, and a video display device such as an LCD flat panel display. The overall performance of the system can be further affected by camera placement, lighting conditions, environment and weather (e.g., smoke, rain, fog), and observer distance from the display. For testing purposes, one may be interested in the effect of one component such as alternative video cameras or lenses, or alternatively one may be interested in the effect of setup conditions such as camera placement or lighting conditions. Depending on the system configuration, certain components may be dominant in limiting the overall performance of the system. One can also be interested primarily in the composite effects of all elements of a particular system, as for example, the image on an LCD display as played back from a recording device that recorded surveillance images at night from a particular monitor camera and further as viewed by an observer at a distance of 40 cm from the display. It is also to be understood that the terminology used herein is for the purpose of describing particular embodiments only and is not intended to limit the scope of the present invention.

It must be noted that as used herein and in the claims, the singular forms "a," "and" and "the" include plural referents unless the context clearly dictates otherwise. Thus, for example, reference to "a camera" includes two or more cameras, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" is used, variations of ±10% are considered to be within the scope of the disclosed limit.

DEFINITIONS

As used herein, the term "test image" refers to an image of a particular test symbol cropped from and image of a set of test symbols captured by an imaging system whose video acuity is to be measured.

As used herein, the term "template image" refers to a digitally generated image of a test symbol or symbols. Template images are typically accurately formed to within the available pixel resolution.

As used herein, the term "selection mask" refers to a binary image which defines a region of interest for further processing. Selection masks can be used to focus attention on particular parts of a test image such as the row of a test chart or an individual symbol.

As used herein, the term "visual acuity" refers to the smallest feature in an image that can be identified. Specifically it is the smallest feature that can be correctly identified with a specified probability (e.g., 60%).

As used herein, the term "video acuity" (A) refers to a measure of visual acuity applied to the average of a set of video frames. Either the number of frames can be selected explicitly, or the time interval can be selected for the averaging period, and all frames within that time interval can be included in the average. Since the number of frames can be one, the term "video acuity" can be used to describe the performance of still imaging devices as well as moving image devices. The measure of video acuity described herein is in units of symbol heights (or letter heights) per degree of visual angle. The units are frequently expressed (imprecisely) as "symbols/degree" or "letters/degree," where it is understood that "symbol" or "letter" refers to the linear dimension of the symbol or letter. Where the terms "symbols/degree" and "letters/degree," are used herein, they are understood in this sense as shorthand for "symbol heights per degree of visual angle" and "letter heights per degree of visual angle."

As used herein, the term "total video acuity" ($A_T$) refers to a global measure of video system performance defined by $A_T = A^2 V_x V_y$, where $V_x$ and $V_y$ are the horizontal and vertical fields of view. The units of $A_T$ are symbol areas (or letter areas).

As used herein, the term "visual angle" refers to the angle in degrees subtended by a feature such as a test symbol of size S at a viewing distance D. Most accurately, the visual angle α is given by $$\alpha = \frac{360}{\pi}\tan^{-1}\left(\frac{S}{2D}\right). \quad (1)$$

In most cases, <<D, and to a close approximation, $$\alpha \cong \frac{180 S}{\pi D}. \quad (2)$$

As used herein, the following symbol definitions apply:

| Symbol | Definition | Example | Unit |
|---|---|---|---|
| D | distance from camera to chart | | cm |
| S | size of symbol (equal to $S_y$ if not otherwise specified) | | cm |
| $S_x$ | width of symbol | | cm |
| $S_y$ | height of symbol | | cm |
| K | number of distinct symbols in chart | 10 | |
| M | maximum symbol size | | cm |
| F | factor change in size between rows | $2^{-1/4}$ | |
| R | number of rows in chart | | |
| $C_y$ | vertical center-to-center spacing between rows as a multiple of the height $S_y$ of the larger symbol | 2 | |
| $C_x$ | horizontal center-to-center spacing between symbols in a row as a multiple of the width $S_x$ of symbols in the row | 2 | |
| $P_y$ | vertical resolution of the imaging system | | pixels |
| B | luminance of chart background | 200 | cd/m² |
| G | cumulative Gaussian | | |
| T | target probability | 0.6 | |
| L | $\log_{10}$ (symbol size in degrees of visual angle) | | $\log_{10}$ degrees |
| α | visual angle | | degrees |
| μ | mean of cumulative Gaussian | | $\log_{10}$ degrees |

| Symbol | Definition | Example Unit |
|---|---|---|
| σ | standard deviation of cumulative Gaussian | $\log_{10}$ degrees |
| A | video acuity | symbol heights per degree |
| $V_x$ | horizontal field of view | degrees |
| $V_y$ | vertical field of view | degrees |
| $A_T$ | total video acuity | symbol areas |

Overview:

The purchase and installation of a video system is often followed by one of two varieties of buyer's remorse: either the system does not provide sufficient quality to do the task, or the equipment is observed to have cost much more than was necessary to do the task. These outcomes are at least in part the result of a lack of standardized metrics to quantify the performance of the system. Equipped with reliable metrics, buyers would more easily be able to identify the least expensive system able to meet their needs.

The problem is illustrated in FIG. 1. A video system is characterized by a long list of system parameters that define physical attributes such as focal length of the lens, aperture, number of pixels, transport bandwidth, and so on. These parameters result in another long list of system effects: alterations in the video that affect quality. Of course, each effect may be influenced by many parameters. Finally, the video system is used to accomplish system tasks, such as weapon detection, face recognition, license plate reading, and so on. Again, there are many such tasks, and each of the many system effects will have some influence on each system task.

The problem for the buyer of the video system is that it is not easy to predict the effect of all the system parameters through all the system effects on the task of interest. What most users need is a way to collapse all of the parameters down to a single number, a quality metric, that they can then relate to their task.

The inventor has developed a particular metric called "video acuity" which can serve as an intervening variable that can relate a given video system to relevant tasks. Video acuity is closely related to the visual acuity measurements routinely used for evaluating human vision (as described below). A letter chart is presented to the video system, and the smallest letter that can be reliably identified in the output image of the video system is determined. We call this metric video acuity. This metric was partly inspired by the existing standard used for human vision assessment, although in this case a simulated human observer is used.

While we are concerned here with the performance of man-made imaging systems, the human vision system is also an imaging system whose performance is routinely quantified. In fact, a measurement of human visual acuity is generally agreed to be the most widely applied medical test in the world. This simple test defines visual acuity as the smallest letter (or similar symbol) that can be identified with a defined probability (e.g., 60%) by the subject observer from a particular distance. There are many ways to quantify visual acuity. The most common is as a ratio where the numerator refers to a test distance between the subject and the chart (usually 20 ft or 6 m), and the denominator is a measure of the largest distance at which a person with "normal" vision can resolve the smallest letters that the subject can resolve at the test distance. If the subject has 20:20 vision, it means that the subject can see clearly at 20 feet what a person with "normal" vision can see at the same distance. If the subject has 20:100 vision, it means the subject must be as close as 20 feet to see what a person with "normal" vision can see at 100 feet. In other words, the smallest letter that can be resolved by the subject is five times larger than "normal."

Taking into account the distance, the letter size can be converted into an angular measure, a number of degrees of visual angle. Visual angle is simply the angle subtended at the eye by the letter at the specified distance. Other measures of visual acuity besides the standard distance ratio can also be used. The one used consistently herein is the inverse of the minimum resolvable letter size, expressed as letters per degree. This variant is useful because it is concrete, and because it increases as acuity gets better. As a point of reference, "normal" (20:20) human visual acuity, is equivalent to 12 letters/degree. That means a "normal" person can identify a letter that is $\frac{1}{12}$ of a degree in size. In fact, average acuity for young healthy human eyes is somewhat better than "normal" at approximately 15 letters/degree.

Image Creation and Capture

In accordance with one or more embodiments of the present invention, a chart can be created by printing a set of black test symbols on white background. Color test symbols can also be used if appropriate to a particular application such as the testing of effects of chromatic aberrations on video acuity. The paper preferably has high reflectance and low specularity (i.e., a matte finish). The ink preferably has very low reflectance (<0.1). The printed chart can be mounted on a firm backing. A set of K distinct symbols are used. In exemplary embodiments, the test symbols are letters printed using the Sloan font (a fixed-width font) commonly used for human eye charts. Ten Sloan letters (K=10) can be used: C, D, H, K, N, O, R, S, V, and Z. These letters are selected to provide a wide variety of letter forms that meaningfully test visual acuity.

The Sloan font [Sloan, L. L., Rowland, W. M., & Altman, A. "Comparison of three types of test target for measurement of visual acuity," Q. Rev. Ophthalmol. Otorhinolaryngol., 8, 4-17, 1952.] originally contained only these 10 symbols, although a complete upper case alphabet is now available if desired. The letters 'C' and 'O' are more easily confused than the other letters, and some researchers recommend using only one of these two letters. The Sloan font can be obtained from Denis Pelli online at psych.nyu.edu/pelli/software.html.

Each letter can be printed once at a particular size and range in size from a maximum of M in steps of a factor of F to a minimum of $MF^{1-R}$, where R is the number of rows (or sizes). For example, a 13-row chart can be produced at quarter-octave size steps to cover a three-octave (factor of 8) size range. The horizontal center-to-center spacing between letters should be a multiple $C_x$ (typically 2) of the letter width $S_x$. The vertical center-to-center spacing should be a multiple $C_y$ (typically 2) of the letter height $S_y$ for the larger row. There should also be a border of at least a fraction of the largest letter size in the chart. An exemplary chart and arrangement of letters is shown in FIG. 2, although other arrangements can be used. While a typical human eye chart would have randomized letter order, such is not necessary for machine analysis where each letter is processed without using information about surrounding letters.

The chart is placed within view of the imaging system and illuminated so that the white background area has a luminance B cd/m² (e.g., 200 cd/m²) as measured from the position of the camera. The printed letters have a contrast of at least 0.9, as measured from the position of the camera. Care is taken to avoid specular reflections from the chart. The chart is positioned at a distance D from the camera. The choice of D will depend on the specifications of the camera system. The chart is placed at a distance such that the range of sizes in the chart span the acuity of the system. A good initial estimate for D can be made as follows:

$$D = 10 M F^{R/2} \frac{P_y}{V_y}, \qquad (3)$$

where M is the maximum letter height, $P_y$ is the vertical system resolution in pixels, and $V_y$ is the vertical field of view in degrees. The video system is set to capture N frames of video.

In accordance with alternate embodiments of the present invention, instead of using a printed chart, an electronic display is placed a distance D from the camera. The display has a resolution of at least 1024 pixels vertically. The display is calibrated to enable production of specified luminances and contrasts. Individual optotypes (letters or symbols) can be presented one at a time on the display and captured using N frames of video. An adaptive procedure can be used to determine the next letter and letter size to be presented so as to minimize the number of letters that need to be processed to determine video acuity.

One of ordinary skill in the art will recognize that the above embodiments of test charts presented to a camera at a distance D are only selected examples of test symbols suitable for use with the image processing methods described herein. What is important in the visual angle subtended by each test symbol: ideally, there are symbols ranging from a size large enough that 100% can be correctly identified to a size small enough that identification is no better than chance. It is useful to have a significant number of test symbols at each size so that a percentage correct or symbol identification can be determined (e.g., 10 Sloan letters, although symbols other than letters and a number greater or less than 10 can be used). The distance D need not be the same for all test symbols. For example, rather than using a chart with variable symbol size all positioned at one distance D, a chart can consist of letters of a single size that is positioned at variable distance D from an imaging camera with a suitably large depth of focus. Further, the symbols need not be deliberately placed in the scene—if suitable symbols or objects that can be used as symbols are present in an image, then such symbols or objects can be used as long as their visual angle as viewed from the imaging camera can be determined, a template image for the symbol or object can be created, and a percentage correct for identification of the symbols can be measured. The number of usable symbols as well as the particular set of symbols can also vary from one size or visual angle to another as long as there are a sufficient number and variety of symbols to allow the determination of a percentage correct for identification. The image processing described herein uses a controlled test chart positioned at a fixed distance D for which the video acuity is straightforward to calculate and for which accuracy of the calculation can be readily estimated, but one of ordinary skill will recognize that the methods can readily be extended to less ideal images.

In order to process and analyze the video image, a set of frame images is collected. If the hardware permits, the rendered digital pixels can be captured as they appear on a display. The captured area is large enough to encompass the entire chart. For example, a total of 12 frames can be captured, or all the frames in a time interval such as 200 ms can be captured. These two specifications are the same at 60 frames/s video rate, although they can differ at other frame rates. 200 ms can be a perceptually appropriate choice corresponding roughly to the response time of the human visual system to image changes. If the perceived appearance of the image is non-linear with respect to the numerical data representation, the captured data can be transformed into luminance data using a luminance model for the display. The captured frames can then be averaged to create a single digital image representing luminance.

Alternatively, the image of the chart can be photographed from the system display using a shutter speed of 200 ms to collect a similar set of averaged frame luminance data. An image capture camera mounted on a tripod with a remote shutter or timer can be used to prevent vibrations, and the image capture camera can be calibrated to produce a luminance record. Preferably, the resolution of the image capture camera is high enough so that one pixel width in the image under test is captured by at least 8 image capture camera pixel widths. The image capture camera can be spatially calibrated to define the ratio between the image capture camera pixel dimensions and the pixel dimension of the image under test. This calibration can be obtained from the captured images itself, given known chart dimensions. For good accuracy, the camera can capture at least 10 bits per color for each pixel. Preferably, the quality of the image capture camera is such that its properties do not degrade the quality of the captured image from that of the display image under test.

If a zoom lens is part of the camera system, then video acuity can be measured at both limits of zoom. Similarly, if the camera system has both high and low light operating modes (e.g., night and day modes), it can be tested under all relevant operating modes.

Image Processing

Processing of the captured luminance image will be described for the example of a set of test symbols comprising a chart of Sloan letters. In accordance with one or more embodiments of the present invention, the captured image of the chart is processed to attempt identification of the letters in each row. This process typically involves cropping to the area of the chart, registering to align a known template image of the chart with the captured image, and attempting identification of each letter in each row of the captured image using a suitable identification algorithm. The result of this process is, for each row, a proportion of correct identifications. The graph that relates proportion correct to letter size can be analyzed to estimate the size that yields a standard proportion correct, for example, 60%. The inverse of that letter or symbol size, expressed in letters/degree or symbols/degree, is the acuity.

More particularly, one can proceed as follows. To register images and match images to selection masks, a general matching operator is used that accepts an input image, a graphic representation of the chart (a "template image"), and a graphic representation of a selection mask. The matching operator also accepts a set of five parameters that govern a similarity transform (x-scale, y-scale, rotation, x-translation, and y-translation). The graphic representations of the chart and selection mask are first transformed geometrically according to the parameters, then rasterized to form a template image and a mask image, each of the same size as the input image. The mask image is then binarized. Pixels in both the input and template images are then selected according to whether the value of the mask image at the corresponding pixel location is 1 or 0. The selected pixels from input and template images are then subjected to a normalized correlation operation. The operator returns the value of the normalized correlation.

Figure 3:
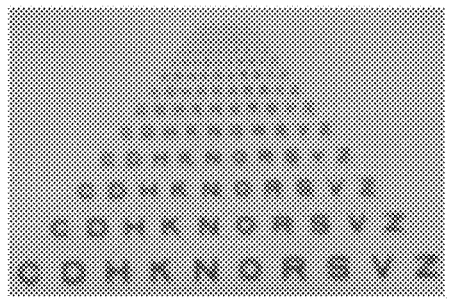
FIG. 3 shows an example test image of the test chart of FIG. 2 together with a template image and selection mask for row 2 and a composite image showing alignment of the images and mask.
Figure 3:
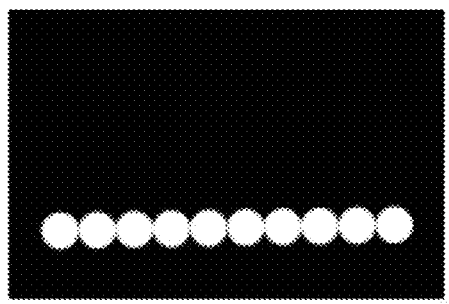
Figure 3:
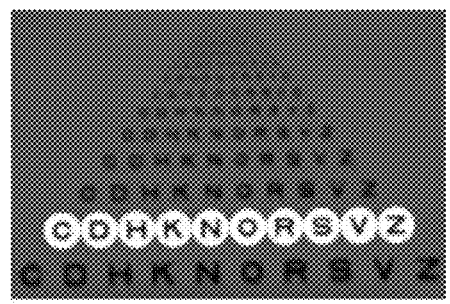

First, the captured image is cropped to approximately the region occupied by the letter chart as is shown, for example, in the cropped test image of FIG. 3A. Then, a global registration of the cropped image to the graphic representation of the letter chart is performed, by finding the global similarity transform parameters (scale, rotation, and translation) that maximize the output of the matching operator described above. For this step, no mask is used.

Each row of the chart is then processed as follows. A graphic representation of a selection mask comprising a region that covers each letter of the row is created, as is shown, for example, in the selection mask for row 2 of FIG. 3A that is illustrated in FIG. 3C. (The relative alignment can be seen in the superimposed images shown in FIG. 3D.) Using the global similarity transform parameters as a starting point, the transformation parameters that maximize the output of the matching operator of a template image for the row (for example, FIG. 3B) to the test image are again found. The best registration of the template and the row has now been found.

Then, using the row-optimal parameters, and for each letter position in the row, a mask that just covers that letter position is created, an image of each possible letter is generated, and its match value using the selection mask is computed (i.e., the normalized correlation of the template image to the letter image within the region defined by the selection mask). The normalized correlation $N(f, t)$ between a test image $f(x, y)$ and a template image $t(x, y)$ is given by $$N(f, t) = \frac{\sum_{x,y} \bar{f}(x, y)\bar{t}(x, y)}{\sqrt{\sum_{x,y} (\bar{f}(x, y))^2 \sum_{x,y} (\bar{t}(x, y))^2}}, \qquad (4)$$

where $$\bar{f}(x,y) = f(x,y) - \bar{f}, \qquad (5)$$

$$\bar{t}(x,y) = t(x,y) - \bar{t}, \qquad (6)$$

and where x and y are horizontal and vertical pixel coordinates, and $\bar{f}$ and $\bar{t}$ are averages over the images. The candidate letter yielding the largest correlation at that position is taken to be the identified letter. For each row, there will be some proportion correct. Chance performance is 1/K or 0.1 for the example of 10 possible letter matches.

The data now consist of a proportion correct for each row, and each row is characterized by a letter size in degrees. The proportion correct versus $\log_{10}$ of letter size (L) is fitted to the function $$P(L) = 1 - (1 - K^{-1})(1 - G(L; \mu, \sigma)) \qquad (7)$$

where G is a cumulative Gaussian with mean $\mu$ and standard deviation $\sigma$. (Note that, while the correlation calculations are conveniently performed in units of pixels, it is convenient to convert to degrees of visual angle on a logarithmic scale from here on: L is in units of $\log_{10}$ degrees.) From the fit of this curve, and the estimated parameters, L is computed to yield the target probability T:

$$L(\mu, \sigma, T, K) = \sqrt{2}\, \sigma \operatorname{erf}^{-1}\left(\frac{K^{-1} - 2T + 1}{K^{-1} - 1}\right) + \mu, \qquad (8)$$

where erf is the well-known Gauss error function. This, in turn, yields the acuity, the inverse of the letter size that is identified with the target probability, $A = 10^{-L}$ symbols/degree.

In addition to acuity, field of view (FOV) is an important parameter of a video system. The field of view of a video system can be easily calculated from knowledge of the sensor size and the focal length of the lens. Once horizontal and vertical FOV ($V_x$ and $V_y$ in degrees) and acuity A are known, it is possible to compute the "total video acuity," a single global measure of a video system that may be useful:

$$A_T = A^2 V_x V_y \text{ symbol areas.} \qquad (9)$$

Ideally, the matching algorithm should be equal in performance to a human observer having normal visual acuity. Quantitative comparisons have not been made, but subjective assessment using P(L)=0.6 suggests that the performance of the algorithm with parameters as described above and in the examples below is close to that of a human observer.

EXAMPLES

Example 1

Nikon D700

Figure 4:
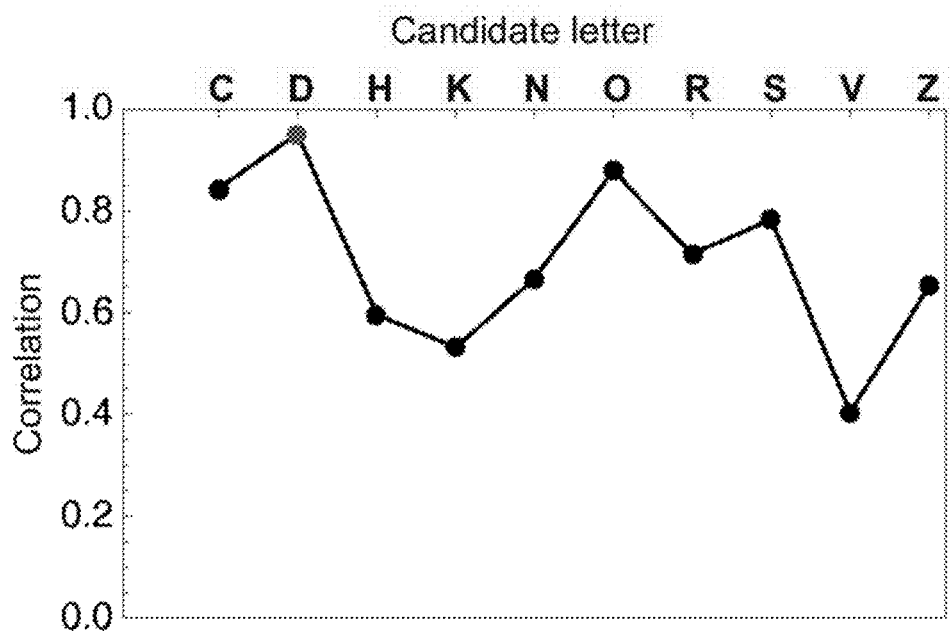
FIG. 4 shows the normalized correlation values for the ten candidate letters at position 2 in row 2 for an example video acuity measurement.
Figure 5:
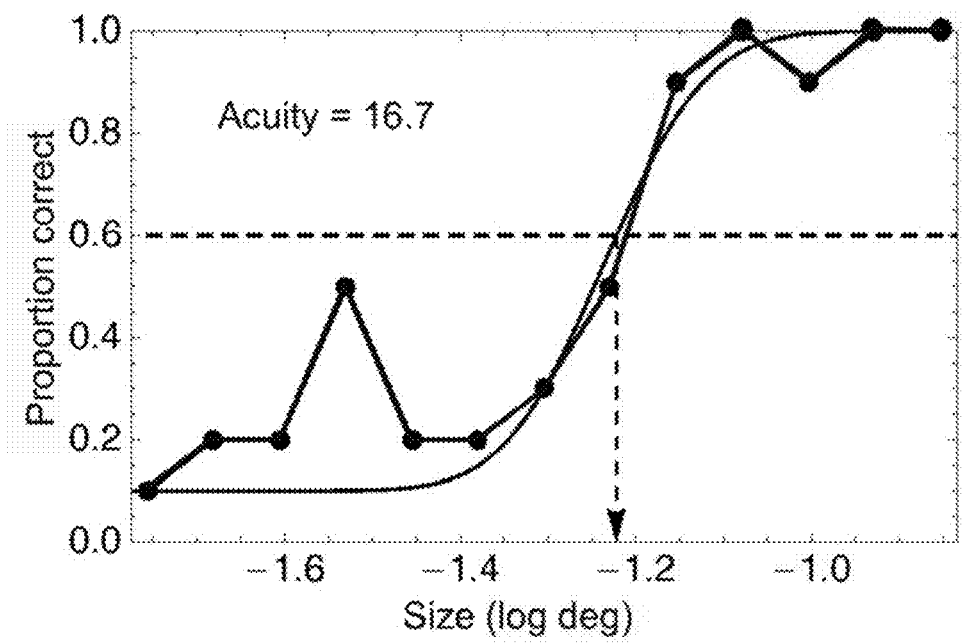
FIG. 5 shows the proportion correct as a function of letter size for a complete chart analysis for a Nikon D700 camera.

The chart of FIG. 2 was printed on 13"×19" paper, and mounted on a wall. The chart was viewed by a video system from a distance of 10 m. The size of the largest letters was 2.45 cm, or about 0.14°. The video system consisted of a Nikon D700 digital SLR camera with a zoom lens (24-120 mm) mounted on a tripod. With the zoom set to the minimum, an image was captured in 12 bit raw format (NEF). This image was converted to 16 bit TIFF format, and then to grayscale values. The image size was 2832 by 4256 pixels. The image was then cropped manually to a size of 173 by 115 pixels. After registration, an example of the normalized correlation values for the ten candidate letters at position 2 in row 2 (the second-largest letters) is shown in FIG. 4. The maximum correlation was obtained for the letter 'D' giving a correct identification. FIG. 5 shows the proportion correct as a function of letter size (in $\log_{10}$ degrees). The fitted curve is a cumulative Gaussian. The intersection of the fitted curve with a target proportion correct (0.6 in this example) gives the video acuity. The result was an estimated video acuity of 16.7 letters/degree.

The FOV can be roughly estimated by noting that the cropped image has a width of about 48.2 cm, which subtends about 2.76° at 10 m, so the visual resolution is about 62.6 pixels/degree. The original image has dimensions 4256 pixels×2832 pixels, or about 67.8°×45.1°, so the total video acuity is $$A_T = 16.7^2 (67.8 \times 45.1) = 853{,}606 \text{ letter areas.} \qquad (10)$$

Example 2

Nikon D700 Compressed

Figure 6:
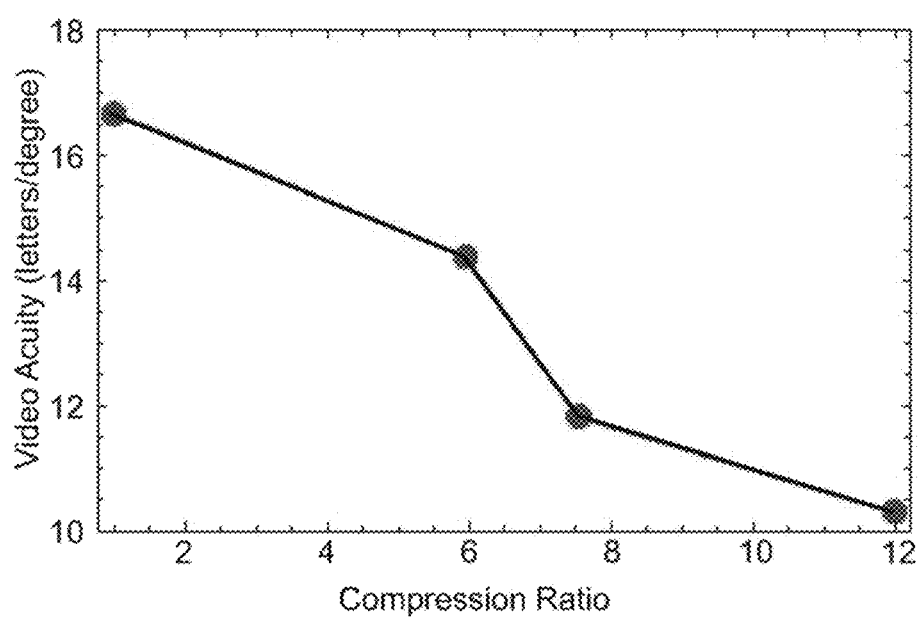
FIG. 6 shows an example of video acuity measured as a function of JPEG compression.

In Example 1, most effects of compression that would typically be encountered in a real-world video system were intentionally excluded. In Example 2, the effects of compression in the video system were simulated by applying JPEG compression to the image. Starting with the grayscale cropped image used above, JPEG compression was applied to three levels. The Video acuity at each level was estimated, and the results are shown in FIG. 6. The point of this exercise is to show that video acuity can estimate the effects of compression on the perceived quality of the image. Measurable degradation of video acuity can be seen at a compression ratio of 6, and further degradation is seen as the compression ratio increases.

Example 3

Canon HV10 Video Camera

Figure 7A:
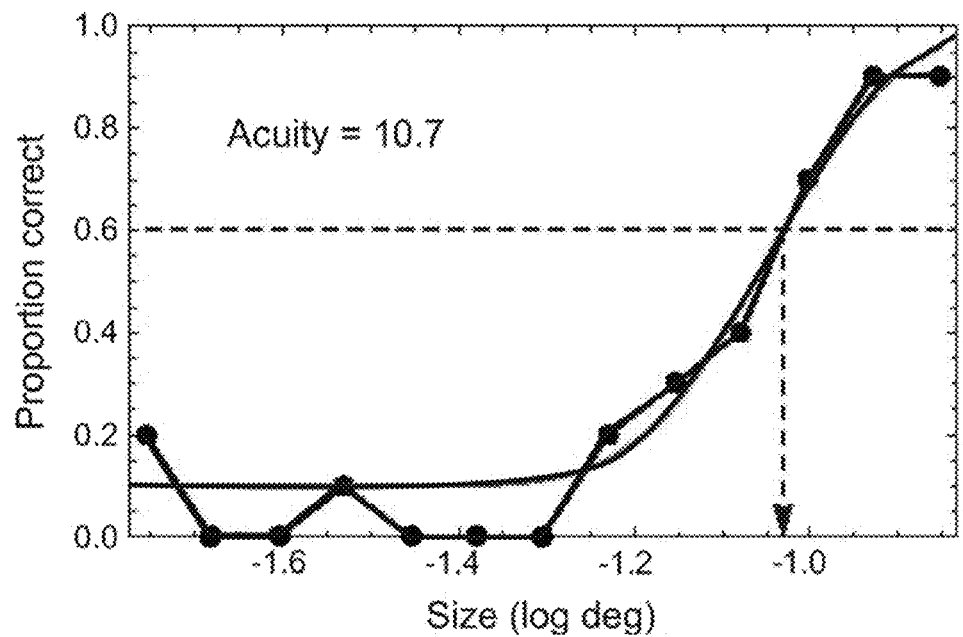
FIGS. 7A & B show the proportion correct as a function of letter size for a complete chart analysis for a Canon HV20 video camera at two different zoom settings.
Figure 7B:
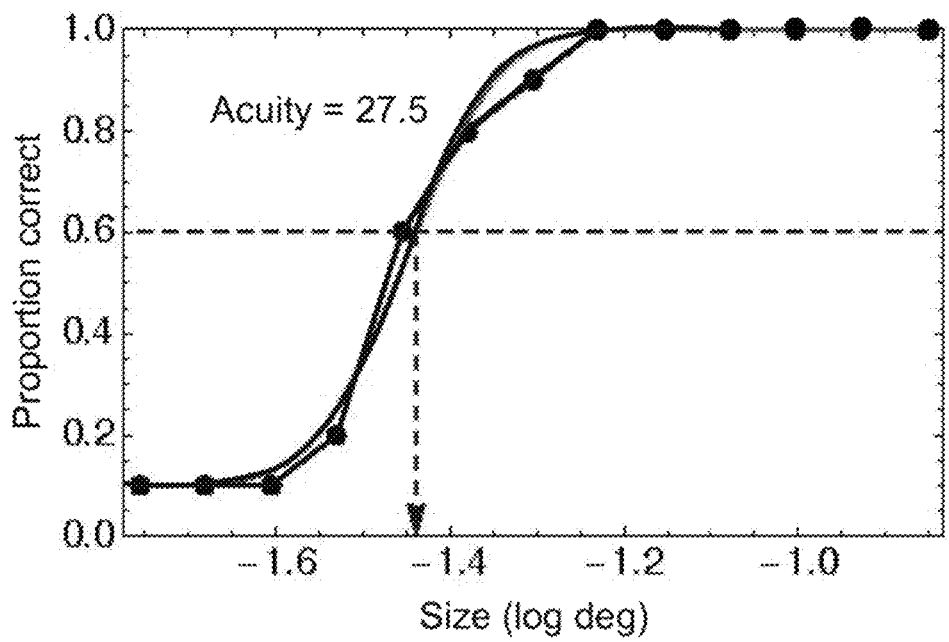

The setup of Example 1 was used with of a Canon HV10 video camera instead of the Nikon camera. Several seconds of video were recorded on MiniDV tape. The video was captured from the camera using the iMovie program (Apple Computer, Inc.). Using QuickTime Player 7 (Apple Computer, Inc.) the video was trimmed to one second, and 12 frames were imported using Mathematica (Wolfram Research, Inc.). The frames were converted to grayscale and averaged. The original image was 1920 pixels×1080 pixels. The image was cropped manually, and processed further as described above. Images were collected for three positions of zoom, but at 10 m distance, only minimum and medium zoom were usable. The resulting cropped images were 283 pixels× 183 pixels and 113 pixels×77 pixels. FIGS. 7 A & B show the results for the two cases. Measured video acuity was 10.7 letters/degree for minimum zoom (FIG. 7A) and 27.5 letters/degree for medium zoom (FIG. 7B).

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

What is claimed is:

1. A method of measuring video acuity of a physical imaging system comprising:
   a) obtaining a digital image including a set of test symbols as rendered by said physical imaging system, wherein said set of test symbols comprises a plurality of symbols repeated at a plurality of symbol sizes;
   b) cropping said digital image to obtain a test image that comprises the set of test symbols;
   c) registering the test image to a template image drawn from a set of template symbols using a matching operator, wherein the matching operator uses similarity transform parameters to register the test image to the template image;
   d) applying a row selection mask to a row of test symbols of the test image, wherein the row selection mask covers each test symbol in the row to create a graphic representation of the row selection mask;
   e) registering the graphic representation of the row selection mask to a template image of a row of template symbols of the set of template symbols, wherein the matching operator uses similarity transform parameters to register the graphic representation of the row selection mask to the template image;
   f) applying a test symbol selection mask to a test symbol in the graphic representation of the row selection mask;
   g) determining a normalized correlation between the test symbol of the test symbol selection mask and a template symbol of the template image;
   h) identifying the test symbol of the test symbol selection mask where the test symbol has the highest normalized correlation with respect to the template image;
   i) repeating steps f) through h) for each test symbol of the set of test symbols;
   j) determining for each symbol size within the set of test symbols, the number of test symbols that were correctly identified; and
   k) identifying the symbol size S above which more than a predetermined fraction of test symbols were correctly identified.

2. The method of claim 1, wherein video acuity is $A=10^{-L}$ symbols/degree, where $L=\log_{10}$ $$\left(\frac{360}{\pi}\tan^{-1}\left(\frac{S}{2D}\right)\right),$$

and D is a viewing distance between a camera in said physical imaging system and a chart comprising said set of test symbols.

3. The method of claim 2, wherein the total video acuity ($A_T$) is computed from:

$$A_T = A^2 V_x V_y \text{ symbol areas,}$$

where $V_x$ is the horizontal field of view in degrees of visual angle and $V_y$ is the vertical field of view in degrees of visual angle.

4. The method of claim 1, wherein said physical imaging system comprises a still camera with output to a still display or printer.

5. The method of claim 1, wherein said physical imaging system comprises a video camera or video display and said digital image of a set of test symbols is obtained from a single frame or the average of a set of frames from said video camera or display.

6. The method of claim 1, wherein said set of test symbols comprises symbols with sizes ranging from a size large enough that 100% were correctly identified to a size small enough that identification was no better than chance.

7. The method of claim 1, wherein said set of test symbols are letters of an alphabet.

8. The method of claim 7, wherein said letters are rendered in the Sloan font.

9. The method of claim 7, wherein said set of test symbols comprise the letters C, D, H, K, N, O, R, S, V, and Z.

10. The method of claim 1, wherein said predetermined fraction is 0.6.

11. The method of claim 1, wherein said identifying the symbol size comprises
    fitting a cumulative Gaussian to the number of test symbols that were correctly identified as a function of symbol size, and
    identifying the symbol size for which the fitted cumulative Gaussian has the value of said predetermined fraction.

12. The method of claim 1, wherein the similarity transform parameters include x-scale, y-scale, rotation, x-translation, and y-translation.

* * * * *